May 5, 1953 A. Y. DODGE 2,637,308
FAN DRIVE CLUTCH
Filed Jan. 19, 1950
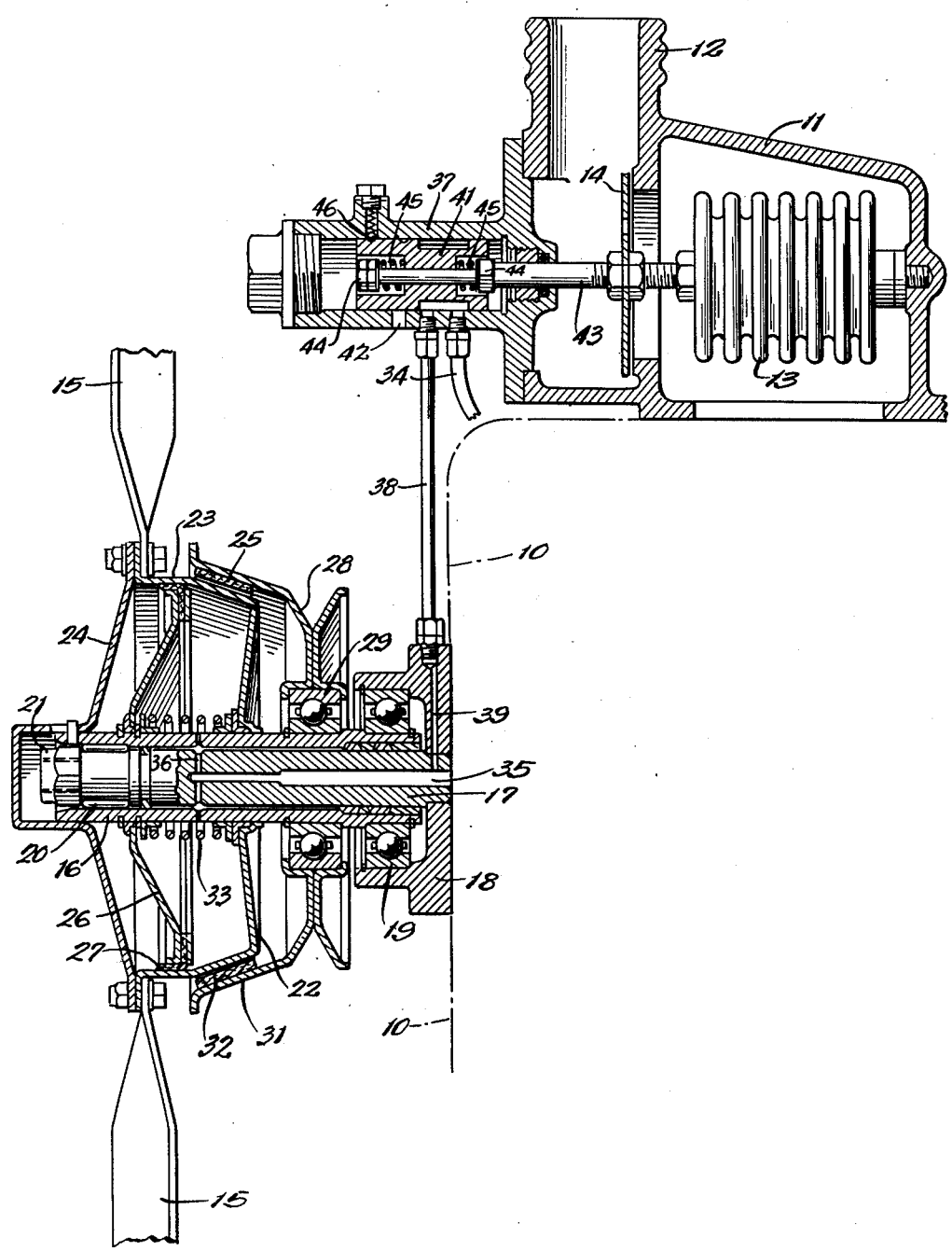
INVENTOR:
Adiel Y. Dodge,
BY Dawson, Ooms, Bartlett Spangenberg,
ATTORNEYS.

Patented May 5, 1953

2,637,308

UNITED STATES PATENT OFFICE 2,637,308

FAN DRIVE CLUTCH

Adiel Y. Dodge, Rockford, Ill.

Application January 19, 1950, Serial No. 139,409

10 Claims. (Cl. 123—41.08)

1

This invention relates to fan drives and more particularly to drives for the fans of engine driven vehicles.

In automotive vehicles it is desirable to have the cooling fan operate when the engine is at high temperature and to disconnect the fan when the engine is at temperatures within or below the normal operating range. The present invention relates to a fan drive for an engine driven vehicle in which the fan is disconnected when the engine temperature is below the maximum desired.

It is one of the objects of the present invention to provide a fan drive which is power operated to insure proper connection and disconnection of the fan. In the preferred construction the mechanism is operated by vacuum through a connection to the engine intake manifold although other power sources could be utilized.

Another object is to provide a fan drive in which power to operate the connecting clutch is controlled in response to the temperature of the engine. According to one feature of the invention the thermostat normally employed to control water flow through the engine may also be utilized to control the fan drive.

Still another object is to provide a fan drive which is normally urged into driving position by a spring or the like and which is disconnected in response to engine temperature. With this construction the fan will be connected on any failure of the mechanism to insure that there will be no overheating of the engine.

The above and other objects and advantages of the invention will be more readily apparent when read in connection with the accompanying drawing, in which—

The single figure is a sectional view of a fan drive mechanism embodying the invention.

The fan drive of the present invention may be employed with any desired type of internal combustion engine indicated partially in outline by the dotted lines 10. The engine is of the usual liquid cooled type employing cooling passages communicating with a thermostat casing 11 mounted at the top of the engine through which the coolant flows. The coolant flows from the casing 11 through a connection 12 to the usual radiator which is preferably mounted in front of the engine to prevent overheating. Flow of coolant may be controlled by a thermostatic bellows 13 mounted in the casing 11 to be submerged in the coolant and which controls a water flow valve 14 regulating the flow of water or other coolant through the engine and the radiator. When the coolant is cold, the bellows 13 will contract to close the valve 14 thereby to decrease the coolant

2 flow. Upon heating or in the event of puncture the bellows will expand to open the valve 14.

Flow of air through the radiator is produced or augmented by a fan 15 mounted at the front of the engine immediately behind the radiator in the conventional construction. The fan is mounted on a sleeve 16 rotatably supported on a stub shaft 17 which is rigidly mounted in a bracket 18 on the front of the engine. The sleeve 16 is carried by a bearing 19 in the bracket 18 and fits rotatably over the shaft 17. A bearing 20 rotatably supports the outer end of the sleeve on the shaft, and a nut 21 holds the bearing 20 in place.

The fan blades 15 are supported by a hollow hub 22 having a cylindrical portion 23 and which fits slidably on the sleeve 16. The outer end of the hub is closed by a coverplate 24 which may enclose the nut 21 so that a hollow chamber having a cylindrical wall portion at 23 is provided. Inward of the wall portion 23 the hub tapers conically, as shown at 25, to form a conical clutch surface.

Within the hub the sleeve 16 carries a piston 26 which is secured to the sleeve against axial movement thereon and which carries packing 27 at its outer edge sealingly and slidably engaging the cylindrical surface 23 of the hub. With this construction the hub and fan may be shifted axially on the sleeve by connecting the hub at one side or the other of the piston to a source of actuating pressure.

The fan is adapted to be driven by a driving pulley 28 rotatably supported on a bearing 29 on the sleeve 16. The pulley may receive the usual fan drive belt driven by the engine to turn the driving member at a speed proportional to engine speed. At one side the pulley is extended to form a conical clutch part 31 complementary to the conical surface 25. Friction lining material 32 may be connected to either of the parts 25 or 31 so that when they are brought into engagement a driving connection will be established between the pulley and the fan, and when they are separated the fan will be free from the pulley.

According to one feature of the present invention the clutch parts are normally urged into engagement by a spring 33 arranged between the piston 26 and the rear wall of the hollow hub. This spring tends to shift the hub and fan to the right as seen in the drawing to move the surface 25 into engagement with the flange 31 thereby to establish a driving connection. Thus, when the mechanism to disengage the clutch is not functioning or in the event of failure of this mechanism the clutch will be engaged to drive the fan.

In the form shown the clutch is adapted to be disengaged by vacuum preferably derived from the intake manifold of the engine through a connection 34. The shaft 17 is formed with a bore 35 communicating through cross passages 36 in the shaft and sleeve 16 with the hollow hub at the right side of the piston 26. When the right side of the piston is connected to vacuum the hub will be shifted to the left to move its clutch surface 25 away from the flange 31 thereby to disconnect the fan from the driving member.

The vacuum connection is controlled by a valve which is preferably operated in response to the engine temperature and which, as illustrated, may be controlled by the conventional water thermostat 13. As shown, a cylindrical valve casing 37 is mounted on the thermostat casing 11 in alignment with the thermostat 13, and the vacuum connection 34 communicates with the casing. A second connection 38 spaced axially from the connection 34 communicates through a passage 39 in the bracket 18 with the port 35 in the shaft 17. A valve spool 41 is slidably mounted in the casing 37 and is formed with an annular recess. In one position of the valve, as shown, the spool recess spans the connections 34 and 38 to establish communication of the hollow hub with the vacuum source. When the spool is shifted to the left the recess will span the pipe 38 and an atmospheric port 42 to connect the hollow hub with atmosphere so that the spring will engage the clutch.

To shift the spool a rod 43 is provided on the thermostat which extends slidably through the spool 41. Abutments such as nuts 44 are provided on the rod, and compression spring 45 lie between the abutments and the ends of the spool. This construction provides a resilient lost motion connection between the thermostat and the control valve. A resilient detent 46 carried by the valve casing 37 engages recesses in the valve spool to hold it resilient in either of its extreme positions. This detent together with the resilient lost motion connection provides a snap action for the valve insuring that it will not occupy an intermediate position in which fluttering or indecisive action might occur.

In operation when the engine is relatively cool the thermostat and valves will occupy substantially the position shown in which the water valve 14 is nearly closed and the valve 41 connects it to a source of vacuum. At this time the hub and fan are shifted to the left out of engagement with the driving flange 31 so that the fan is disconnected and is free to rotate. As the engine temperature increases, the thermostat will expand to open the valve 14 further and to compress the spring 45 at the right of the valve 41. When the thermostat has expanded to the desired extent determined by adjustment of the mechanism, the force exerted by the right hand spring 45 will be sufficient to overcome the force of the spring detent 46, and the valve will shift rapidly to the left to connect the pipe 38 with atmosphere. At this time both sides of the piston 26 will be connected to atmosphere and the spring 33 will shift the hub and fan to the right to engage the clutch surfaces. The fan will, therefore, be connected to the driving member and will be driven by the engine.

If the engine temperature again drops, the thermostat 13 will contract and reverse the operation. It will be noted that at this time the left hand spring 45 will be compressed to produce a rapid shifting of the valve 41 back to the position shown to effect disengagement of the fan drive.

While one embodiment of the invention has been shown and described in detail herein, it will be understood that this is illustrative only and is not to be taken as a definition of the scope of the invention, reference being had for this purpose to the appended claims.

What is claimed is:

1. A fan drive for an engine driven vehicle comprising a rotatable fan, a driving member rotatable relative to the fan, frictionally engageable parts connected respectively to the fan and the driving member, said parts being relatively shiftable into and out of engagement, fluid pressure operated means to shift the parts, a valve to control the pressure operated means, a second valve to control circulation of coolant through the engine, and a thermostatic device responsive to the temperature of the engine connected to both of the valves to control them.

2. A fan drive for an engine driven vehicle comprising a rotatable fan, a driving member rotatable relative to the fan, frictionally engageable parts connected respectively to the fan and the driving member, said parts being relatively shiftable into and out of engagement, fluid pressure operated means to shift the parts, a valve to control the pressure operated means, a second valve to control circulation of coolant through the engine, a thermostatic device responsive to the temperature of the engine to control the second valve, and a resilient connection between the thermostatic device and the first named valve.

3. A fan drive for an engine driven vehicle comprising a supporting shaft, a fan having a hollow hub slidably and rotatably mounted on the shaft, a piston rotatable on the shaft but held against axial movement thereon and having a slidable sealing fit at its periphery in the hollow hub, the piston dividing the hub into a pair of closed chambers, a driving member rotatable on the shaft and held against axial movement thereon, the hub and driving member being formed with cooperating friction surfaces to move into and out of engagement as the hub is shifted axially on the shaft, means to shift the hub in one direction and means to connect said chambers to different sources of pressure to shift the hub in the other direction.

4. A fan drive for an engine driven vehicle comprising a supporting shaft, a fan having a hollow hub slidably and rotatably mounted on the shaft, a piston rotatable on the shaft but held against axial movement thereon and fitting slidably in the hollow hub, the piston dividing the hub into a pair of closed chambers, a driving member rotatable on the shaft, the hub and driving member being formed with cooperating friction surfaces to move into and out of engagement as the hub is shifted axially on the shaft, a spring urging the hub in one direction to engage the friction surfaces, a connection from one of said chambers to a source of fluid pressure and the other chamber being vented to atmosphere to shift the hub in the other direction, and a valve controlling said connection.

5. A fan drive for an engine driven vehicle comprising a supporting shaft, a fan having a hollow hub slidably and rotatably mounted on the shaft, a piston rotatable on the shaft but held against axial movement thereon and fitting slidably in the hollow hub, a driving member rotatable on the shaft, the hub and driving member being formed with cooperating friction surfaces to move into and out of engagement as the hub is shifted axially on the shaft, a spring urging the hub in one direction to engage the friction surfaces, a connection from the hub interior on one side of the piston to a source of fluid pressure to shift the hub in the other direction, a valve controlling said connection, a second valve controlling circulation of coolant through the engine, and control means responsive to the temperature of the engine connected to both of the valves to control them.

6. The construction of claim 5 in which the connection between the first named valve and the control means is a resilient lost motion connection.

7. A fan drive for an engine driven vehicle comprising a supporting shaft, a fan having a hollow hub slidably and rotatably mounted on the shaft, a piston rotatable on the shaft but held against axial movement thereon and fitting slidably in the hollow hub, a driving member rotatable on the shaft, the hub and driving member being formed with cooperating friction surfaces to move into and out of engagement as the hub is shifted axially on the shaft, a spring urging the hub in one direction to engage the friction surfaces, a connection from the hub interior on one side of the piston to a source of fluid pressure to shift the hub in the other direction, a valve in said connection, a second valve controlling circulation of coolant through the engine, a control thermostat responsive to the temperature of the engine, a resilient lost motion connection between the thermostat and the first named valve, and a rigid connection between the thermostat and the second valve.

8. A fan drive for an engine driven vehicle comprising a supporting shaft, a fan having a hollow hub slidable and rotatable on the shaft, a piston rotatable on the shaft but held against axial movement thereon and slidably fitting in the hollow hub, a driving member rotatable on the shaft, the hub and driving member being formed with cooperating friction surfaces to move into and out of engagement as the hub is shifted axially on the shaft, a spring urging the hub in one direction to engage the friction surfaces, a connection from the hub interior to a source of vacuum to shift the hub in the other direction in response to vacuum, a valve in the connection, and a thermostat to control the valve.

9. A fan drive for an engine driven vehicle comprising a supporting shaft, a fan having a hollow hub slidable and rotatable on the shaft, a piston rotatable on the shaft but held against axial movement thereon and slidably fitting in the hollow hub, a driving member rotatable on the shaft, the hub and driving member being formed with cooperating friction surfaces to move into and out of engagement as the hub is shifted axially on the shaft, a spring urging the hub in one direction to engage the friction surfaces, a connection from the hub interior to a source of vacuum, to shift the hub in the other direction in response to vacuum, and a fluid filled bellows connected to the valve to control it, the bellows normally holding the valve open and contracting when cool to close it.

10. The construction of claim 9 in which the connection between the bellows and the valve is resilient and spring detents are provided acting on the valve to give it a snap action.

ADIEL Y. DODGE.

References Cited in the file of this patent

UNITED STATES PATENTS

| Number | Name | Date |
|---|---|---|
| 1,233,518 | Snyder | July 17, 1917 |
| 1,481,306 | Stuart | Jan. 22, 1924 |
| 1,481,307 | Stuart | Jan. 22, 1924 |
| 2,022,709 | Embery et al. | May 10, 1933 |
| 2,438,161 | Greenlee | Mar. 23, 1948 |
| 2,454,182 | Kampa | Nov. 16, 1948 |